United States Patent
Bao et al.

(10) Patent No.: US 10,437,504 B1
(45) Date of Patent: Oct. 8, 2019

(54) MULTI-TIER STORAGE SYSTEM WITH DATA MOVER MODULES PROVIDING DISTRIBUTED MULTI-PART DATA MOVEMENT

(71) Applicant: EMC IP Holding Company LLC, Hopkinton, MA (US)

(72) Inventors: Haiyun Bao, Beijing (CN); Sorin Faibish, Newton, MA (US); Caiping Zheng, Beijing (CN); Sen Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 15/480,050

(22) Filed: Apr. 5, 2017

(51) Int. Cl.
*G06F 3/06* (2006.01)

(52) U.S. Cl.
CPC ............ *G06F 3/0647* (2013.01); *G06F 3/061* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 7,631,155 B1 * | 12/2009 | Bono | | G06F 3/0608 711/156 |
| 7,694,191 B1 * | 4/2010 | Bono | | G06F 11/004 714/48 |
| 7,818,535 B1 * | 10/2010 | Bono | | G06F 12/0868 711/173 |
| 7,873,619 B1 * | 1/2011 | Faibish | | G06F 16/13 707/705 |
| 7,933,875 B2 * | 4/2011 | Coverston | | G06F 16/185 707/652 |

(Continued)

OTHER PUBLICATIONS

Webopedia, "API—Application Program Interface", Mar. 6, 2016, pp. 1-2, https://web.archive.org/web/20160306051707/https://www.webopedia.com/TERM/A/API.html (Year: 2016).*

(Continued)

*Primary Examiner* — Christopher D Birkhimer
(74) *Attorney, Agent, or Firm* — Ryan, Mason & Lewis, LLP

(57) ABSTRACT

An apparatus in one embodiment comprises a storage system having at least first and second storage tiers each comprising a plurality of storage devices. The storage system implements a plurality of data mover modules for controlling movement of data objects between the first and second storage tiers. A given one of the data objects is transferred between the first and second storage tiers utilizing a distributed multi-part data movement protocol in which different portions of the given data object are transferred between the first and second storage tiers by different ones of the data mover modules. For example, each of the different portions may be transferred between the first and second storage tiers by its corresponding data mover module as a plurality of distinct non-overlapping parts. In such an arrangement, each of the plurality of distinct non-overlapping parts of each of the different portions may have a corresponding unique tag identifier.

20 Claims, 10 Drawing Sheets

(56) References Cited

U.S. PATENT DOCUMENTS

| | | | | |
|---|---|---|---|---|
| 8,015,215 | B2* | 9/2011 | Coverston | G06F 16/16 707/803 |
| 8,095,577 | B1* | 1/2012 | Faibish | G06F 16/13 707/823 |
| 8,285,758 | B1* | 10/2012 | Bono | G06F 16/119 707/822 |
| 8,566,371 | B1* | 10/2013 | Bono | G06F 16/119 707/822 |
| 8,762,628 | B2* | 6/2014 | Kurashige | G06F 12/0868 711/103 |
| 8,825,652 | B1 | 9/2014 | Faibish et al. | |
| 8,972,465 | B1 | 3/2015 | Faibish et al. | |
| 9,020,996 | B2* | 4/2015 | Lord | G06F 16/174 707/828 |
| 9,213,721 | B1* | 12/2015 | Faibish | G06F 16/185 |
| 9,223,800 | B1 | 12/2015 | Faibish et al. | |
| 9,244,779 | B2* | 1/2016 | Littlefield | G06F 11/1469 |
| 9,417,754 | B2* | 8/2016 | Smith | G06F 3/0416 |
| 9,557,929 | B2* | 1/2017 | Littlefield | G06F 11/1469 |
| 2006/0004957 | A1* | 1/2006 | Hand, III | G06F 12/0866 711/113 |
| 2008/0052293 | A1* | 2/2008 | Coverston | G06F 16/185 |
| 2008/0065583 | A1* | 3/2008 | Coverston | G06F 16/16 |
| 2010/0153634 | A1 | 6/2010 | Fellinger et al. | |
| 2012/0084523 | A1* | 4/2012 | Littlefield | G06F 11/1469 711/162 |
| 2012/0331021 | A1* | 12/2012 | Lord | G06F 16/174 707/826 |
| 2013/0036260 | A1* | 2/2013 | Kurashige | G06F 12/0868 711/103 |
| 2013/0227194 | A1 | 8/2013 | Kannan et al. | |
| 2013/0290598 | A1* | 10/2013 | Fiske | G06F 3/0625 711/103 |
| 2016/0048408 | A1* | 2/2016 | Madhu | G06F 11/1458 718/1 |
| 2016/0147472 | A1* | 5/2016 | Littlefield | G06F 11/1469 711/162 |
| 2016/0188181 | A1* | 6/2016 | Smith | G06F 3/0416 715/765 |
| 2016/0359705 | A1* | 12/2016 | Parandehgheibi | H04L 63/1425 |

OTHER PUBLICATIONS

Computer Hope, "Hard Disk Controller", Mar. 2, 2015, pp. 1, https://web.archive.org/web/20150302133510/https://www.computerhope.com/jargon/h/hdc.htm (Year: 2015).*

"EMC 2 Tiers Solution Prototype," http://veddiew.typepad.com/blog/2015/05/emc-two-tiers-storage-solution-prototype.html, Sep. 25, 2015, 2 pages.

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC ScaleIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System."

Adam Moody, "Overview of the Scalable Checkpoint / Restart (SCR) Library," S&T Principal Directorate—Computation Directorate, Oct. 14, 2009, 33 pages.

U.S. Appl. No. 14/973,245 filed in the name of Sorin Faibish et al. on Dec. 17, 2015 and entitled "Multi-Tier Storage System Having Front-End Storage Tier Implemented Utilizing Software-Defined Storage Functionality."

U.S. Appl. No. 15/185,236 filed in the name of Sorin Faibish et al. on Jun. 17, 2016 and entitled "Storage System Comprising Cluster File System Storage Nodes and Software-Defined Storage Pool in Cloud Infrastructure."

The Apache Software Foundation,"Hadoop Archives Guide," https://hadoop.apache.org/docs/rl.2.1/hadoop_archives.html, 2008, 4 pages.

U.S. Appl. No. 15/064,314 filed in the name of Sorin Faibish et al. on Mar. 8, 2016 and entitled "Multi-Tier Storage System Configured for Efficient Management of Small Files Associated with Internet of Things."

U.S. Appl. No. 15/447,965 filed in the name of Sorin Faibish et al. on Mar. 2, 2017 and entitled "Multi-Tier Storage System with Dynamic Power Management Utilizing Configurable Data Mover Modules."

U.S. Appl. No. 15/445,008 filed in the name of Sorin Faibish et al. on Feb. 28, 2017 and entitled "Storage System with Directory-Based Storage Tiering."

C. Yan et al., "Hmfs: Efficient Support of Small Files Processing over HDFS," Algorithms and Architectures for Parallel Processing: Lecture Notes and Computer Science, Aug. 2014, pp. 54-67, vol. 8631.

* cited by examiner

```
// Data Structures struct UploadArg {
    string pfsPath<>;
    string oid<>;
};

struct DistributeMultipartArg {
    string pfsPath<>;
    string oid<>;
    string uploadID<>;
    int first;
    int nParts;
};

struct PartDoneArg {
    int partNumber;
    string tag<>;
};
```

FIG. 8

```
// It runs on master DM of the file to serve the
// multi-part upload RPC call asynchronously
DM::multipartUpload(UploadArg arg)
{
    size = getFileSize(arg->pfsPath);

// 1. Get the UploadID
    uploadID = obsClient.createMultipartUpload(arg.oid);

// 2. Call the distribute multi-part upload
    for (i = 0; i < N_DM; i++) {
        with distributedMultipartArg {
            .pfsPath = arg.pfsPath;
            .oid = arg.oid;
            .uploadID = uploadID;
            .first = partNumber(i, N_DM, size);
            .nParts = partNumber(i+1, N_DM, size) - .first;
        }
        rpc.asyncCall(ion[i], distributedMultipartUpload,
                              distributedMultipartArg);
    }

// 3. Wait for the result
    while (!rpc.asyncComplete()) {
        rpc.getMultipartDone(doneArg, WAIT);
        eTags[doneArg.partNumber] = doneArg.tag;
    }

// 4. Complete the multi-part upload
    obsClient.completeMultipartUpload(
        arg.oid, uploadID, eTags);
}
```

FIG. 9

```
// It runs on multiple DMs in parallel.
DM::distributedMultipartUpload(
    DistributeMultipartArg *arg)
{
    size = getFileSize(job->pfsPath);

// perform multi-part for the all parts in parallel
    for (i = 0; i < job->nParts; i++) {
        part_number = job->first + i;
        begin = part_number * PART_SIZE;
        end = min(begin + PART_SIZE, size);
        // part will start to be uploaded in the callable
        callable[i] = obsClient.multipartCallable(
                                  job->pfsPath, begin, end,
                                  job->uploadID, part_number);
    } for (i = 0; i < job->nParts; i++) {
        // wait the callable to complete
        doneArg = callable[i].get();
        // notify the master DM
        rpc.asyncCall(job.master, MULTIPART_DONE, doneArg);
        // because the callables are likely to be "first start
        // first complete", master DM is likely to see the
        // multi-part progress smoothly
    }
}
```

FIG. 10

MULTI-TIER STORAGE SYSTEM WITH DATA MOVER MODULES PROVIDING DISTRIBUTED MULTI-PART DATA MOVEMENT

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors. However, conventional storage tiering arrangements can be unduly inflexible when implemented in a storage system that comprises a parallel file system. For example, transfer of large files or other types of data objects between storage tiers of such a storage system can be inefficient and potentially wasteful of storage system resources under certain conditions.

SUMMARY

Illustrative embodiments provide multi-tier storage systems with distributed multi-part data movement utilizing configurable data mover modules. For example, some embodiments allow each of a plurality of data mover modules to transfer non-overlapping parts of a corresponding portion of a large file or other data object between storage tiers of a multi-tier storage system. Such embodiments can advantageously provide significantly improved efficiency in transfer of large files and other types of data objects between a fast tier and a capacity tier of a multi-tier storage system. Similar advantages can be provided in other types of multi-tier storage systems.

In one embodiment, an apparatus comprises a storage system having at least first and second storage tiers each comprising a plurality of storage devices. The storage system implements a plurality of data mover modules for controlling movement of data objects between the first and second storage tiers. A given one of the data objects is transferred between the first and second storage tiers utilizing a distributed multi-part data movement protocol in which different portions of the given data object are transferred between the first and second storage tiers by different ones of the data mover modules. For example, each of the different portions may be transferred between the first and second storage tiers by its corresponding data mover module as a plurality of distinct non-overlapping parts. In such an arrangement, each of the plurality of distinct non-overlapping parts of each of the different portions may have a corresponding unique tag identifier.

The given data object may comprise a single data file or a plurality of data files. The first storage tier illustratively implements a parallel file system comprising a plurality of parallel file system nodes, and the second storage tier illustratively implements at least one object store comprising a plurality of object storage nodes and in which stored data objects have respective unique object identifiers.

In some embodiments, a distributed multi-part data movement protocol for transfer of a given data object comprises at least first, second and third phases.

In the first phase, a first one of the data mover modules obtains an upload identifier, communicates the upload identifier to other ones of the data mover modules, and identifies to each of the other data mover modules its corresponding one of the different portions of the given data object to be transferred.

In the second phase, the first one of the data mover modules transfers its corresponding one of the different portions of the given data object in a plurality of distinct non-overlapping parts each having a unique tag identifier, and receives from each of the other data mover modules unique tag identifiers of respective ones of a plurality of distinct non-overlapping parts of the corresponding one of the different portions transferred by that data mover module.

In the third phase, the first one of the data mover modules completes the transfer of the given data object utilizing the unique tag identifiers for all of the distinct non-overlapping parts of each of the different portions.

Other numbers and types of phases involving different operations can be used in a distributed multi-part data movement protocol in other embodiments.

A multi-tier storage system in some embodiments comprises at least one configuration file associated with the data mover modules. For example, the data mover modules may be configurable in at least first and second different modes of operation, each involving utilization of a different number of the data mover modules to transfer a data object of a particular size between the first and second storage tiers, by storing respective first and second different sets of information in the configuration file.

The data mover modules in some embodiments are implemented using respective SYNCer modules of a 2 TIERS™ storage system, although other types of data mover modules can be used in other embodiments.

These and other illustrative embodiments include, without limitation, apparatus, systems, methods and processor-readable storage media.

BRIEF DESCRIPTION OF THE DRAWINGS

FIGS. 8, 9 and 10 show respective portions of a set of example pseudocode for implementing distributed multi-part data movement utilizing multiple data mover modules of a multi-tier storage system in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
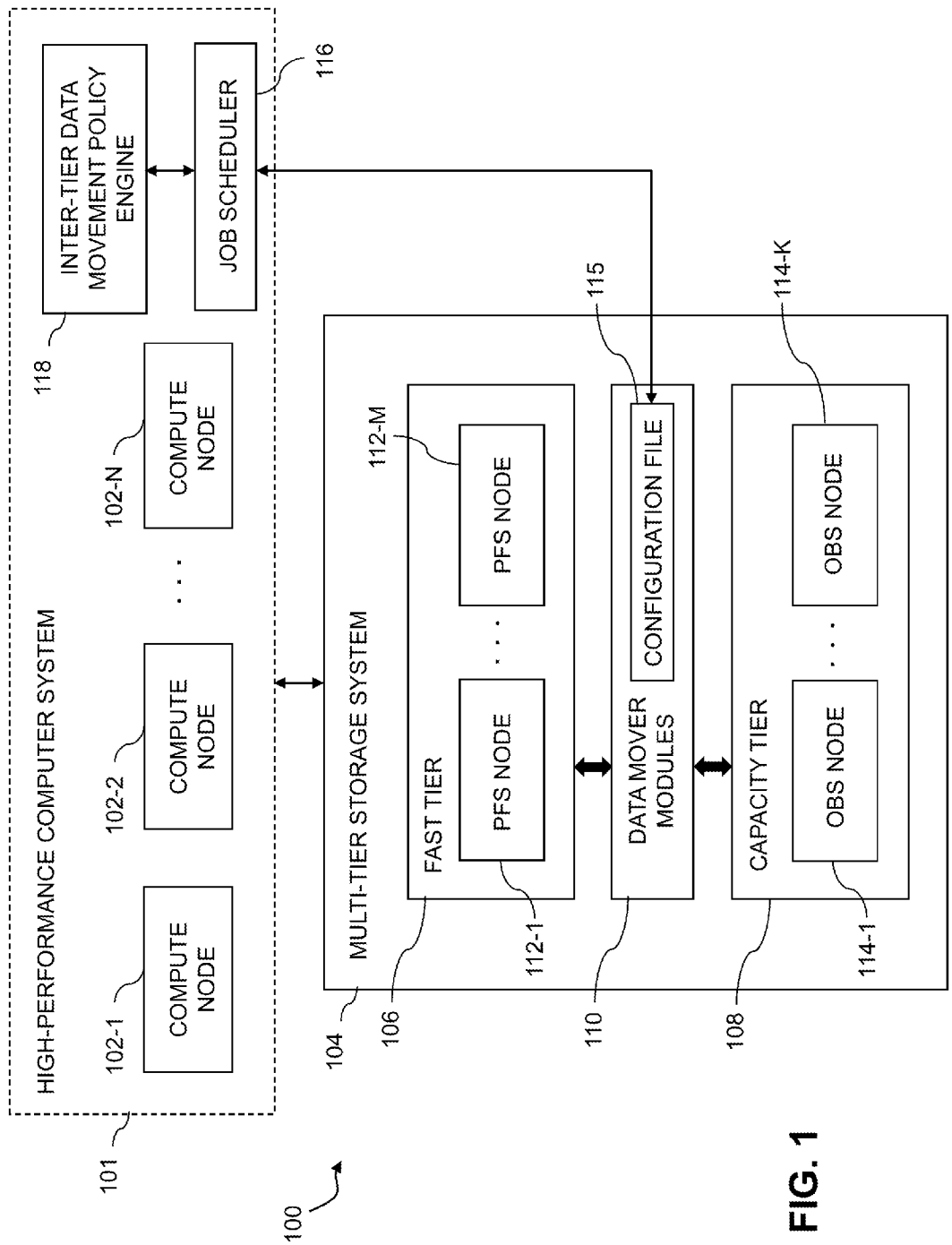
FIG. 1 is a block diagram of an information processing system comprising a multi-tier storage system with multiple data mover modules providing distributed multi-part data movement in an illustrative embodiment.

FIG. 1 shows an information processing system 100 configured in accordance with an illustrative embodiment. The information processing system 100 comprises a high-performance computer (HPC) system 101 that includes compute nodes 102-1, 102-2, . . . 102-N. The compute nodes 102 communicate with a multi-tier storage system 104 over one or more networks that are not explicitly shown in the figure.

The compute nodes 102 illustratively comprise respective processing devices of one or more processing platforms. For example, the compute nodes 102 can comprise respective virtual machines each having a processor and a memory. Numerous other configurations are possible. The compute nodes 102 in the present embodiment are illustratively part of a supercomputer or other implementation of HPC system 101.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The multi-tier storage system 104 comprises a fast tier 106, a capacity tier 108 and data mover modules 110. The fast tier 106 is an example of what is more generally referred to herein as a "front-end storage tier" or still more generally a "first storage tier" of the multi-tier storage system 104. The capacity tier 108 is an example of what is more generally referred to herein as a "back-end storage tier" or still more generally a "second storage tier" of the multi-tier storage system 104. Other types and arrangements of two or more storage tiers can be used in other embodiments. Each of the fast tier 106 and the capacity tier 108 is assumed to comprise a plurality of storage devices.

The multi-tier storage system 104 in the present embodiment illustratively implements a parallel file system (PFS) comprising PFS nodes 112-1 through 112-M associated with the fast tier 106. The PFS nodes 112 may comprise respective PFS servers of the fast tier 106. In other embodiments, an additional set of PFS servers or other type of PFS nodes may be associated with the capacity tier 108. Each such PFS server may be associated with one or more storage devices of its corresponding storage tier. The PFS nodes 112 may be viewed as examples of what are more generally referred to herein as "storage nodes."

The storage devices of the fast tier 106 in some implementations more particularly comprise non-volatile memory (NVM) devices. Examples of such storage devices include flash memory devices, 3D XPoint devices, non-volatile random access memory (NVRAM) devices, or other types of non-volatile memory devices including phase-change RAM (PC-RAM) and magnetic RAM (MRAM). Various combinations of multiple different types of non-volatile memory devices may also be used.

The capacity tier 108 in this embodiment illustratively comprises a plurality of object storage nodes ("OBS nodes") 114-1, . . . 114-K. The OBS nodes 114 of the capacity tier 108 collectively implement at least one object store in which stored data objects have respective unique object identifiers. The OBS nodes 114 may also be viewed as examples of what are more generally referred to herein as "storage nodes."

The storage devices of the capacity tier 108 in some implementations more particularly comprise hard disk drive (HDD) devices. Additional or alternative types of storage devices that may be implemented in the capacity tier 108 include solid state drive (SSD) devices as well as other types of disk-based or electronic memory.

The data mover modules 110 of the multi-tier storage system 104 are configured to move data between the fast tier 106 and the capacity tier 108, for example, by moving data files or other data objects between the PFS nodes 112 of the fast tier 106 and the OBS nodes 114 of the capacity tier 108. It is assumed in this embodiment that the data mover modules 110 are separate from the fast tier 106 and the capacity tier 108. However, numerous other arrangements are possible. For example, one or more of the data mover modules 110 can each be implemented at least in part utilizing one of the PFS nodes 112 of the fast tier 106.

A given one of the data objects is transferred between the fast tier 106 and the capacity tier 108 utilizing a distributed multi-part data movement protocol in which different portions of the given data object are transferred between the fast tier 106 and the capacity tier 108 by different ones of the data mover modules 110. The given data object may comprise a single data file, or multiple data files.

In accordance with one possible implementation of the distributed multi-part data movement protocol, each of the different portions is transferred between the fast tier 106 and the capacity tier 108 by its corresponding one of the data mover modules 110 as a plurality of distinct non-overlapping parts. Each of the plurality of distinct non-overlapping parts of each of the different portions illustratively has a corresponding unique tag identifier.

More particularly, the distributed multi-part data movement protocol in this embodiment includes at least first, second and third phases, although different numbers and types of phases can be used in other embodiments.

In a first phase of the distributed multi-part data movement protocol for transfer of the given data object, a first one of the data mover modules 110 is configured to obtain an upload identifier for the given data object, to communicate the upload identifier to other ones of the data mover modules 110, and to identify to each of the other data mover modules 110 its corresponding one of the different portions of the given data object to be transferred.

In a second phase of the distributed multi-part data movement protocol for transfer of the given data object, the first one of the data mover modules 110 is configured to transfer its corresponding one of the different portions of the given data object in a plurality of distinct non-overlapping parts each having a unique tag identifier, and to receive from each of the other data mover modules 110 unique tag identifiers of respective ones of a plurality of distinct non-overlapping parts of the corresponding one of the different portions transferred by that data mover module.

In a third phase of the distributed multi-part data movement protocol for transfer of the given data object, the first one of the data mover modules 110 is configured to complete the transfer of the given data object utilizing the unique tag identifiers for all of the distinct non-overlapping parts of each of the different portions.

As another example of the above-described distributed multi-part data movement protocol, assume that the data transfer involves an upload of a data object from a PFS of the fast tier 106 into an OBS of the capacity tier 108. The first one of the data mover modules 110 obtains an upload identifier from the capacity tier 108, and provides it to the other data mover modules 110 along with identification of their respective different portions of the data object to be transferred. All of the involved data mover modules 110 then transfer non-overlapping parts of their respective different portions of the data object from the fast tier 106 to the capacity tier 108, and the first one of the data mover modules 110 receives the unique tag identifiers of the transferred non-overlapping parts from the other data mover modules 110. Finally, the first one of the data mover modules 110 utilizes the unique tag identifiers to complete the upload.

Additional examples of distributed multi-part data movement protocols in illustrative embodiments will be described below in conjunction with FIGS. 6 and 7.

In the FIG. 1 embodiment, it is assumed that the data mover modules 110 comprise respective configurable data mover modules. A given such configurable instance of the data mover modules 110 is adapted to interact with the fast tier 106 and the capacity tier 108. At least one configuration file 115 is implemented in or otherwise associated with one or more of the data mover modules 110. For example, the configuration file 115 may be implemented at least in part within a given one of the data mover modules 110 and shared by multiple ones of those modules. Alternatively, each of the data mover modules 110 may comprise its own internal instance of the configuration file 115. Accordingly, a data mover module configuration file as that term is broadly used herein may be associated with a single one of the data mover modules 110 or shared by multiple ones of the data mover modules 110. The relationships between data mover modules and configuration files in illustrative embodiments may therefore be one-to-one, many-to-one or one-to-many.

Also, although configuration file 115 is shown as being internal to the data mover modules 110 in this embodiment, in other embodiments one or more such configuration files may be implemented externally to the data mover modules 110 in another component of the multi-tier storage system 104. For example, in some embodiments, the configuration file or files may be implemented within a component of the HPC system 101 or in an additional system component that is external to both the HPC system 101 and the multi-tier storage system 104.

The state of the configuration file 115 is illustratively controlled at least in part by a job scheduler 116 implemented as part of the HPC system 101. The job scheduler 116 interacts with an inter-tier data movement policy engine 118 that is also assumed to be part of the HPC system 101 in this embodiment. In other embodiments, at least one of the job scheduler 116 and the inter-tier data movement policy engine 118 may be implemented at least in part externally to the HPC system 101. For example, one or both of these components may be implemented within the multi-tier storage system 104.

Also, although job scheduler 116 interacts with configuration file 115 and inter-tier data movement policy engine 118 in the FIG. 1 embodiment, it is possible that applications running on the compute nodes 102 may additionally or alternatively interact with one or both of the configuration file 115 and the inter-tier data movement policy engine 118. Such interaction may be via one or more application programming interfaces (APIs).

The data mover modules 110 in the present embodiment alter a manner in which data is moved between the fast tier 106 and the capacity tier 108 based at least in part on a change in state of the configuration file 115. For example, in some embodiments, the state of the configuration file 115 determines a particular number of the data mover modules 110 that will participate in a distributed multi-part data movement protocol for movement of a data object of a particular size between the fast tier 106 and the capacity tier 108.

In a more particular example of such an arrangement, the data mover modules 110 are configurable in a first mode of operation in which a first subset of the data mover modules 110 are utilized in transferring a data object of a particular size between the fast tier 106 and the capacity tier 108, and are further configurable in one or more additional modes of operation in which respective different subsets of the data mover modules 110 are utilized in transferring the data object of the particular size between the fast tier 106 and the capacity tier 108. The first mode of operation illustratively utilizes fewer of the data mover modules 110 than each of the one or more additional modes of operation.

Accordingly, the data mover modules 110 are configurable in some embodiments in at least first and second different modes of operation, each involving utilization of a different number of the data mover modules 110 to transfer a data object of a particular size between the fast tier 106 and the capacity tier 108, by storing respective first and second different sets of information in the configuration file 115.

For example, a first value stored in at least part of the configuration file 115 can direct the data mover modules 110 to enter the first mode of operation and a second value stored in that same part of the configuration file 115 can direct the data mover modules 110 to enter the second mode of operation. The data mover modules 110 may be controllable in this manner as a group or alternatively on a per-module basis. In an arrangement of the latter type, values stored in respective different parts of the configuration file 115 can control respective different ones of the data mover modules 110.

Numerous other types of first mode and second mode configurations may be used. Also, more than two distinct inter-tier data movement modes may be supported.

One or more of the data mover modules 110 can each include at least one API that permits an external component to control selection between the first and second different modes of operation by directing storage of a particular one of the first and second different sets of information in the configuration file 115. For example, the job scheduler 116 can access the configuration file 115 via such an API in order to control the mode of operation of one or more of the data mover modules 110. Additionally or alternatively, an application running on one or more of the compute nodes 102 can access the configuration file 115 via the API in order to control the mode of operation of one or more of the data mover modules 110.

In some embodiments, at least one of the data mover modules 110 is configurable via the configuration file 115 in a mode of operation in which a particular type of data movement between the fast tier 106 and the capacity tier 108 occurs for a given data file being utilized by an application running on one or more of the compute nodes 102 only after the application has changed an extended attribute of the given data file from a value preventing such data movement to a value permitting such data movement. In an arrangement of this type, the data mover modules 110 can be placed in a mode of operation in which particular types of data movement are performed for certain data files based at least in part on extended attributes of those data files as established via the parallel file system.

The particular operating modes of the data mover modules 110 that are based at least in part on a current state of at least a portion of the configuration file 115 are presented by way of example only and should not be viewed as limiting in any way. Additional or alternative operating modes can be used in other embodiments.

Furthermore, other embodiments can configure the data mover modules 110 in different modes of operation without the use of configuration file 115. Thus, such a configuration file should not be viewed as a requirement.

Although the multi-tier storage system 104 is shown in FIG. 1 as being entirely separate from the HPC system 101, this is by way of illustrative example only. In other embodiments, at least a subset of the PFS nodes 112-1, . . . 112-M of the fast tier 106 may be implemented in respective ones of the compute nodes 102. Numerous other alternative system configurations are also possible.

Accordingly, a given one of the PFS nodes 112-1, . . . 112-M of the fast tier 106 may in some embodiments be associated with a flash memory device, a 3D XPoint device, an NVRAM device or another type of non-volatile memory device of one of the compute nodes 102, or another type of storage device of such a compute node. In an arrangement of this type, at least one of the compute nodes 102 implements at least a portion of the fast tier 106 of the multi-tier storage system 104.

Processing devices utilized to implement system components such as the data mover modules 110 are assumed to be interconnected with one another using high-speed connections. For example, data can be moved between these and other system components using remote direct memory access (RDMA) connections over Gigabit Ethernet ("GbE") or InfiniBand ("IB"). As another example, some embodiments can be configured to utilize an Intel Omni-Path Host Fabric Interface (OP HFI). Numerous other types of connections and associated data transfer protocols can be used in other embodiments, including Fibre Channel.

In some embodiments, the fast tier 106 is implemented at least in part using software-defined storage such as ScaleIO™ or ViPR® both of which are commercially available from Dell EMC of Hopkinton, Mass. Additional details regarding ScaleIO™ functionality that can be incorporated into a multi-tier storage system in illustrative embodiments can be found in, for example, EMC ScaleIO™ User Guide, V1.32, Document No. 302-001-033, Rev. 11, May 2015, which is incorporated by reference herein.

The capacity tier 108 in some embodiments is implemented at least in part utilizing a scale-out network-attached storage (NAS) cluster and/or an object store.

For example, the capacity tier 108 can include a scale-out NAS cluster implemented using Isilon® platform nodes and associated accelerators in the S-Series, X-Series and NL-Series product lines, all commercially available from Dell EMC.

Additionally or alternatively, the capacity tier 108 can include an object store implemented using cloud storage such as Elastic Cloud Storage (ECS) from Dell EMC. Other examples of object stores that can be used in a given embodiment include object stores implemented using object-based storage products such as Atmos, also from Dell EMC.

The capacity tier 108 in some embodiments includes an object store that is part of the same cloud infrastructure that provides the compute nodes 102. Examples of cloud-based object stores that can be utilized for object store in some embodiments include Amazon Simple Storage Service (S3), GCP Cloud Storage, and Microsoft Azure Blob Storage.

A given such object store of the capacity tier 108 is configured to store a plurality of objects. Each of the objects stored in the object store is assumed to have a unique object identifier (OID). It is also possible that the capacity tier 108 could comprise multiple object stores, or other types of object storage.

A specified set of objects stored in the object store may be made accessible to an application running on a given one of the compute nodes 102 via a corresponding dynamically loadable namespace (DLN) identifier. The DLN identifier is associated with a DLN object stored in the object store, with the DLN object comprising identifiers of respective ones of the objects in the specified set.

In some embodiments, a translator at least partially incorporated in or otherwise associated with the multi-tier storage system 104 implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of an object store of the capacity tier 108 are made accessible to the application via the name node. The translator via the translation services and the at least one index table permits applications running on respective compute nodes having no knowledge of the object storage structure of the object store to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed and entitled "Translation-Based Name Node Configuration for Object Access in a Multi-Tier Storage System," which is commonly assigned herewith and incorporated by reference herein.

Again, the fast tier 106, capacity tier 108 and data mover modules 110 are all assumed to be part of the multi-tier storage system 104 of information processing system 100, although other arrangements are possible in other embodiments. For example, components such as data mover modules 110 in other embodiments can be implemented at least in part externally to the multi-tier storage system 104.

Also, it should be noted that data mover modules 110 that are shown as separate from the fast tier 106 and capacity tier 108 in the FIG. 1 embodiment can be implemented at least in part within at least one of the tiers. For example, at least portions of the data mover modules 110 can be implemented in a distributed manner using storage nodes that are used to implement respective portions of at least one of the fast and capacity tiers.

It is assumed that the fast tier 106 has a relatively high input-output processing speed and a relatively low capacity and the capacity tier 108 has a relatively low input-output processing speed and a relatively high capacity, although other types of multi-tier storage systems can be used in other embodiments.

The data mover modules 110 are illustratively coupled to the fast tier 106 and the capacity tier 108 and configured to control transfer of data between these storage tiers. The term "data movement" as used in this and other contexts herein is intended to be broadly construed, so as to encompass data migration as well as other types of movement of data between storage tiers of a multi-tier storage system. A given data mover module can be implemented at least in part on storage arrays or other storage platforms that implement at least portions of one or more of the storage tiers of the multi-tier storage system 104.

As indicated previously, each of the fast tier 106 and the capacity tier 108 of the multi-tier storage system 104 comprises a plurality of storage devices with different types of storage devices being used in different ones of the storage tiers. For example, the fast tier 106 may comprise flash drives while the capacity tier 108 comprises hard disk drives or solid state drives. The particular storage devices used in a given storage tier may be varied in other embodiments, and multiple distinct storage device types may be used within a single storage tier. The term "storage device" as used herein is intended to be broadly construed, so as to encompass, for example, flash drives, hard disk drives, solid state drives, hybrid drives or other types of storage devices.

The storage devices utilized in the fast tier 106 are generally significantly faster in terms of read and write access times than the storage devices utilized in the capacity tier 108. Accordingly, the fast tier 106 in some embodiments is a relatively small storage tier optimized for IO processing speed, while the capacity tier 108 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Such alternative arrangements can include, for example, one or more intermediate storage tiers arranged between the front-end and back-end storage tiers of a multi-tier storage system 104.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 106 and the capacity tier 108 of the multi-tier storage system 104 are implemented at least in part utilizing a 2 TIERS™ storage system from Dell EMC. By way of example, a given 2 TIERS™ storage system may comprise DSSD™ server-based flash storage devices utilized to implement at least portions of fast tier 106, and a scale-out NAS cluster and/or an object store utilized to implement at least a portion of capacity tier 108. In such an arrangement, an IO dispatcher software layer of the 2 TIERS™ storage system may be configured to provide at least a portion of the data mover modules 110. For example, such an IO dispatcher software layer can be used to pre-fetch data from the capacity tier 108 into the fast tier 106, as well as to support other types of data movement. In some embodiments, this functionality is performed utilizing SYNCer modules of the 2 TIERS™ storage system.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 110 may be configured to control movement of data between the fast tier 106 and the capacity tier 108 in order to facilitate achievement of desired levels of performance by system users.

The "users" in this embodiment may refer, for example, to respective ones of the compute nodes 102, although the term "user" as utilized herein is intended to be broadly construed so as to encompass numerous other arrangements of human, hardware, software or firmware entities, as well as combinations of such entities.

The data mover modules 110 can communicate with the compute nodes 102, fast tier 106 and capacity tier 108 via one or more networks or other types of communication media. In distributed implementations, different modules or other portions of a given distributed system component such as data mover modules 110 can be implemented in respective ones of a plurality of storage nodes.

It is to be appreciated that these and other features of illustrative embodiments are presented by way of example only, and should not be construed as limiting in any way.

Accordingly, different numbers, types and arrangements of system components such as compute nodes 102, fast tier 106, capacity tier 108 and data mover modules 110 can be used in other embodiments.

The fast tier 106, capacity tier 108, data mover modules 110 and possibly other elements of the system 100 can be implemented using one or more storage platforms. For example, a given storage platform can comprise any of a variety of different types of storage including storage area networks (SANs), direct-attached storage (DAS) and distributed DAS, as well as combinations of these and other storage types, including software-defined storage. A given storage platform may comprise storage arrays such as VNX® and Symmetrix VMAX® storage arrays or scale-out all-flash storage arrays such as XtremIO™, all commercially available from Dell EMC. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The data mover modules 110, as well as other system components, may be implemented at least in part using processing devices of such processing platforms.

For example, in a distributed implementation of the data mover modules 110, such modules may be implemented in respective LXCs running on respective ones of the compute nodes 102 or on storage nodes of the fast tier 106 or capacity tier 108.

Communications between the various elements of system 100 may take place over one or more networks not explicitly shown. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as Gigabit Ethernet, InfiniBand, Omni-Path Host Fabric Interface or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated previously, the fast tier 106 in other embodiments can be implemented using storage devices and associated storage servers of at least a subset of the compute nodes 102. For example, a given one of the compute nodes 102 as illustrated can include a PFS storage server associated with local flash storage devices of the compute node. Other ones of the compute nodes 102 may similarly implement respective PFS storage servers and associated local flash storage devices so as to collectively provide the fast tier 106. The capacity tier 108 in some embodiments is implemented using storage nodes each comprising an OBS storage server and one or more corresponding storage devices.

The operation of the information processing system 100 will now be described in further detail with reference to the flow diagram of FIG. 2. The process as shown includes steps 200 through 204, and is suitable for use in the system 100 but is more generally applicable to other types of systems comprising a multi-tier storage system providing distributed multi-part data movement.

In step 200, a multi-tier storage system is configured to include at least first and second storage tiers each comprising multiple storage devices. As mentioned previously, the multi-tier storage system in some embodiments implements a fast tier comprising a parallel file system and a capacity tier comprising one or more object stores. By way of example, in some embodiments the parallel file system is implemented using OrangeFS ("OFS") although other embodiments can utilize other types of parallel file systems including GPFS, Lustre and PVFS. Parallel file systems in some implementations of this type are also sometimes referred to as "distributed file systems" or "cluster file systems."

In step 202, a plurality of data mover modules are implemented in the multi-tier storage system for controlling movement of data objects between the first and second storage tiers. For example, the data mover modules are illustratively configurable in different modes of operation in which different numbers of the data mover modules are utilized in transferring a data object of a particular size between the first and second storage tiers.

Each such data mover module may be separately configurable into different modes of operation by a job scheduler, application or other component of the information processing system that includes the multi-tier storage system. Alternatively, the data mover modules may be controllable as a group. Such separate or group control may involve the use of one or more configuration files.

Figure 2:
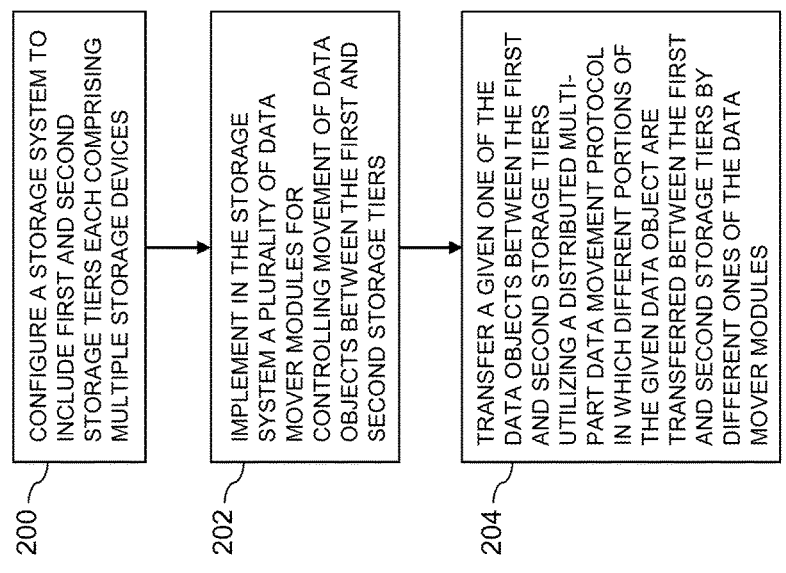
FIG. 2 is a flow diagram of a process for distributed multi-part data movement utilizing data mover modules of a multi-tier storage system in an illustrative embodiment.

With reference by way of example to the previously-described FIG. 1 embodiment, the first and second storage tiers of the FIG. 2 process illustratively comprise the respective fast tier 106 and capacity tier 108, and the data mover modules of the FIG. 2 process comprise respective ones of the data mover modules 110.

In step 204, a given one of the data objects is transferred between the first and second storage tiers utilizing a distributed multi-part data movement protocol in which different portions of the given data object are transferred between the first and second storage tiers by different ones of the data mover modules.

For example, each of the different portions may be transferred between the first and second storage tiers by its corresponding data mover module as a plurality of distinct non-overlapping parts. In such an arrangement, each of the plurality of distinct non-overlapping parts of each of the different portions may have a corresponding unique tag identifier.

The multi-tier storage system in the illustrative embodiments of FIGS. 1 and 2 may be implemented at least in part utilizing the above-noted 2 TIERS™ storage system from Dell EMC. More particularly, the data mover functionality of the multi-tier storage system is implemented at least in part utilizing SYNCer modules of the 2 TIERS™ storage system. Accordingly, data mover modules of the multi-tier storage system are illustratively implemented as respective 2 TIERS™ SYNCer modules. Such SYNCer modules are illustratively part of an IO dispatcher software layer of the 2 TIERS™ storage system.

Movement of data between the storage tiers of the multi-tier storage system is illustratively controlled by SYNCer modules configured to perform data movement operations such as movement of data files from a storage node of the fast tier to a storage node of the capacity tier and vice-versa.

Numerous different conditions can lead to movement of data between the storage tiers in the FIG. 2 embodiment and other embodiments disclosed herein. For example, data movement between a capacity tier and a fast tier can be scheduled to occur before a given compute job begins, or at various points during the compute job as it executes. In some embodiments, the SYNCer modules of the 2 TIERS™ storage system are controlled via one or more configuration files accessible via an API.

In some embodiments, the SYNCer modules are implemented at least in part within OFS and are tightly coupled with OFS file operations. SYNCer modules can be configured to provide eager tiering, in which files are moved from a capacity tier to a fast tier prior to start of a compute job, and lazy tiering, in which files are moved from the capacity tier to the fast tier at the time the files are first opened. On-demand delivery can also be provided, in which IO from data files is delivered directly to an application running on one or more compute nodes only upon request. Similar policies are implemented for movement from the fast tier to the capacity tier when a given file is closed and placed on a "dirty list" within OFS. Files on the "dirty list" include those files that are being written by one or more applications.

It is to be appreciated that the FIG. 2 process can be adapted for use with a wide variety of other types of multi-tier storage systems, including by way of example a multi-tier storage system in which the fast tier comprises burst buffer appliances and/or a software-defined storage pool, and a multi-tier storage system in which the capacity tier comprises a scale-out NAS cluster and/or an object store.

The particular processing operations and other system functionality described in conjunction with the flow diagram of FIG. 2 are presented by way of illustrative example only, and should not be construed as limiting the scope of the embodiments in any way. Alternative embodiments can use other types of processing operations involving a multi-tier storage system that provides distributed multi-part data movement functionality utilizing configurable data mover modules. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different storage system instances within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Numerous other embodiments of information processing systems comprising compute nodes and a multi-tier storage system can be configured utilizing the techniques disclosed herein. Such embodiments can utilize a wide variety of additional or alternative storage tiering and data movement arrangements.

It should therefore be understood that the particular system configurations and operations described above are presented by way of illustrative example only, and should not be construed as limiting in any way. Numerous alternative configurations of compute nodes, storage tiers, data mover modules and other system elements can be used in other embodiments. For example, although some embodiments utilize OFS, the disclosed techniques can be extended in a straightforward manner to any of a wide variety of alternative parallel file systems.

In these and other embodiments, a multi-tier storage system can be offered to cloud infrastructure customers as a platform-as-a-service offering.

Additional illustrative embodiments implementing multi-part data movement will now be described with reference to FIGS. 3 through 10.

Figure 3:
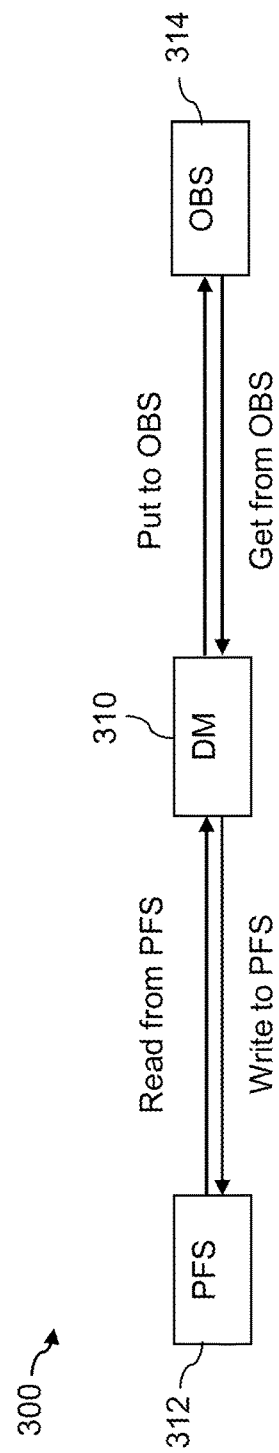
FIG. 3 shows different types of data movement that occur in a multi-tier storage system in an illustrative embodiment.

Referring now to FIG. 3, an information processing system 300 comprises a multi-tier storage system having a data mover ("DM") module 310. The multi-tier storage system further comprises a fast tier that implements a parallel file system or PFS 312 and a capacity tier that implements object storage or OBS 314. The figure illustrates various types of data movement that can occur between the fast tier and the capacity tier via the DM module 310. In this embodiment, the data movement illustratively includes reading from PFS 312, writing to PFS 312, putting an object to OBS 314 and getting an object from OBS 314. Other types of data movement can be supported in other embodiments.

Figure 4:
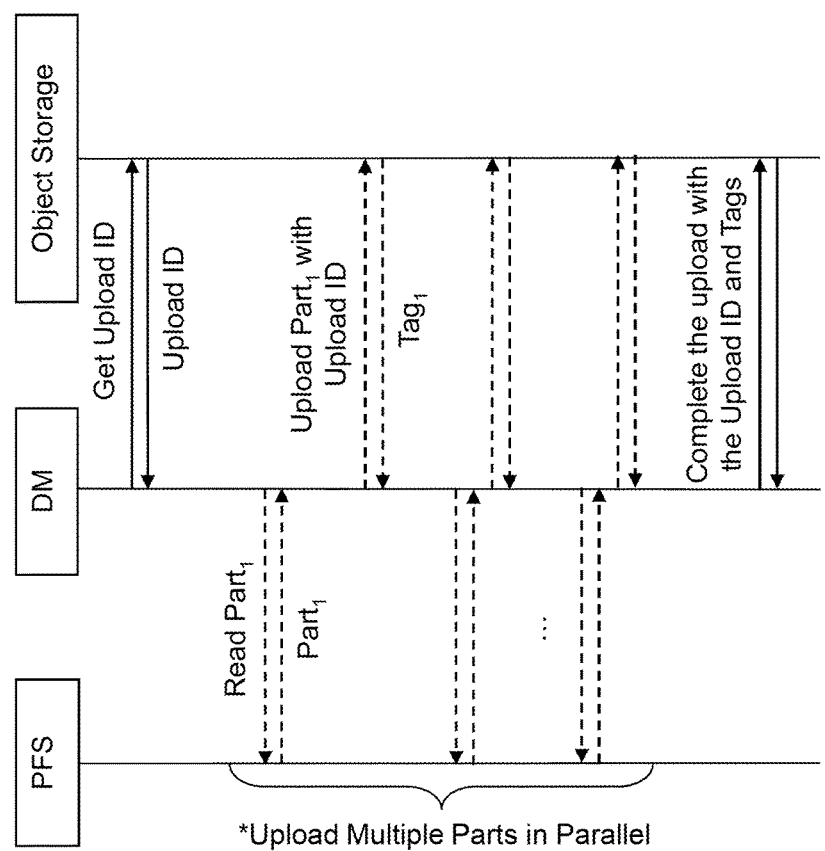
FIGS. 4 and 5 show examples of multi-part data flows utilizing a single data mover module of a multi-tier storage system in an illustrative embodiment.
Figure 5:
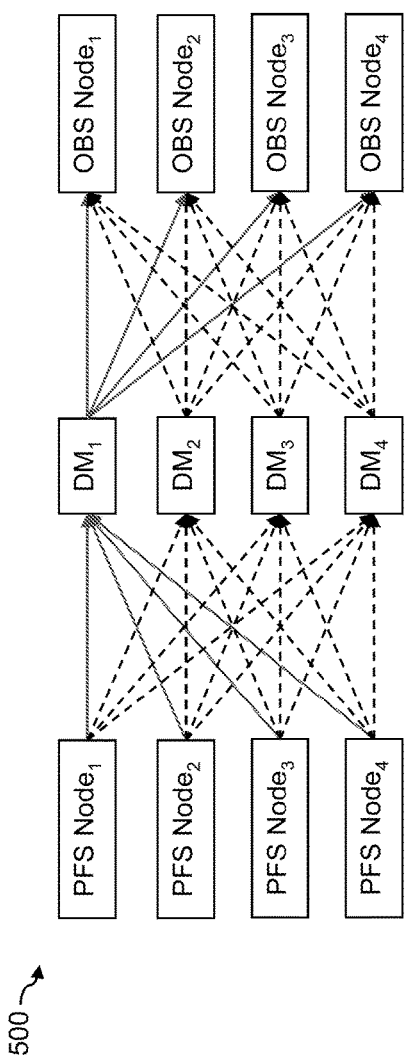

FIGS. 4 and 5 show examples of multi-part data flows utilizing a single data mover module of a multi-tier storage system in an illustrative embodiment.

With reference initially to FIG. 4, multi-part data movement between a PFS and an OBS via a single DM is illustrated. The data movement in this embodiment involves the DM uploading a data object in multiple parts from the PFS to the OBS. Initially, the DM gets an Upload ID from the OBS. It then uploads multiple parts in parallel from the PFS to the OBS. For example, the first part that it reads from the PFS is denoted $Part_1$. This first part and the other parts of the data object are read in parallel from the PFS by the DM and then uploaded in parallel from the DM to the OBS. For each part uploaded from the DM to the OBS, the OBS provides the DM with a unique tag identifier. For example, the DM receives the tag identifier $Tag_1$ from the OBS responsive to uploading $Part_1$ to the OBS as illustrated. The DM similarly receives unique tag identifiers from the OBS for the other uploaded parts of the data object being transferred from the PFS to the OBS.

The parallel uploading of multiple parts of a data object in the FIG. 4 embodiment illustratively utilizes multiplexing or multithreading functionality implemented within the multi-tier storage system. Such an arrangement provides better utilization of available bandwidth of the DM while also ensuring that each relatively smaller part of the data object can be uploaded in a relatively shorter amount of time than that which would otherwise be required absent use of the multi-part data movement. In addition, upload retry time is reduced in the event that the upload of any particular part fails.

FIG. 5 shows the interactions between PFS nodes, DMs and OBS nodes in an information processing system 500 comprising a multi-tier storage system. In this embodiment, the multi-tier storage system includes a fast tier comprising four PFS nodes denoted $PFS\ Node_1$, $PFS\ Node_2$, $PFS\ Node_3$ and $PFS\ Node_4$, and a capacity tier comprising four OBS nodes denoted $OBS\ Node_1$, $OBS\ Node_2$, $OBS\ Node_3$ and $OBS\ Node_4$. The multi-tier storage system further comprises four DMs coupled between the PFS nodes of the fast tier and the OBS nodes of the capacity tier as illustrated. The DMs of the multi-tier storage system in this embodiment are denoted $DM_1$, $DM_2$, $DM_3$ and $DM_4$.

In implementing an instance of multi-part data movement of the type previously described in conjunction with FIG. 4, the system 500 utilizes a single data mover module $DM_1$ to upload the multiple parts in parallel from the PFS nodes to the OBS nodes. The interconnections involved in this multi-part data movement between the PFS nodes and $DM_1$ and between $DM_1$ and the OBS nodes are shown as solid arrows in the figure. Other interconnections between the PFS nodes and the other DMs denoted $DM_2$, $DM_3$ and $DM_4$ and between $DM_2$, $DM_3$ and $DM_4$ and the OBS nodes are shown as dashed arrows in the figure.

The multi-part data movement arrangements involving a single data mover module as illustrated in FIGS. 4 and 5 can be inefficient when small numbers of large data objects are being transferred between the fast tier and the capacity tier of the multi-tier storage system. Large data object transfer of this type is commonplace in the above-noted 2 TIERS™ storage system as well as in other multi-tier storage systems implementing hierarchical storage management (HSM) techniques.

For example, if a single large data file or other large data object is being uploaded using a single data mover module such as $DM_1$ in FIG. 5, the interconnections shown as dashed arrows remain idle during the upload. The resources of the other data mover modules $DM_2$, $DM_3$ and $DM_4$ are not utilized and are therefore wasted during the upload of the large data object by the first data mover module $DM_1$.

Also, because all of the parts of the large data object have to pass through the first data mover module $DM_1$, the throughput traffic is restricted to the bandwidth of that single data mover module. This unduly limits the achievable upload time for transferring the large data object between the fast tier and the capacity tier.

Moreover, the PFS nodes and the OBS nodes are generally configured with a bandwidth that is much higher than that of any single data mover module such as $DM_1$. Accordingly, available resources of the PFS nodes and the OBS nodes are underutilized during transfer of a large data object in the manner illustrated in FIGS. 4 and 5.

Figure 6:
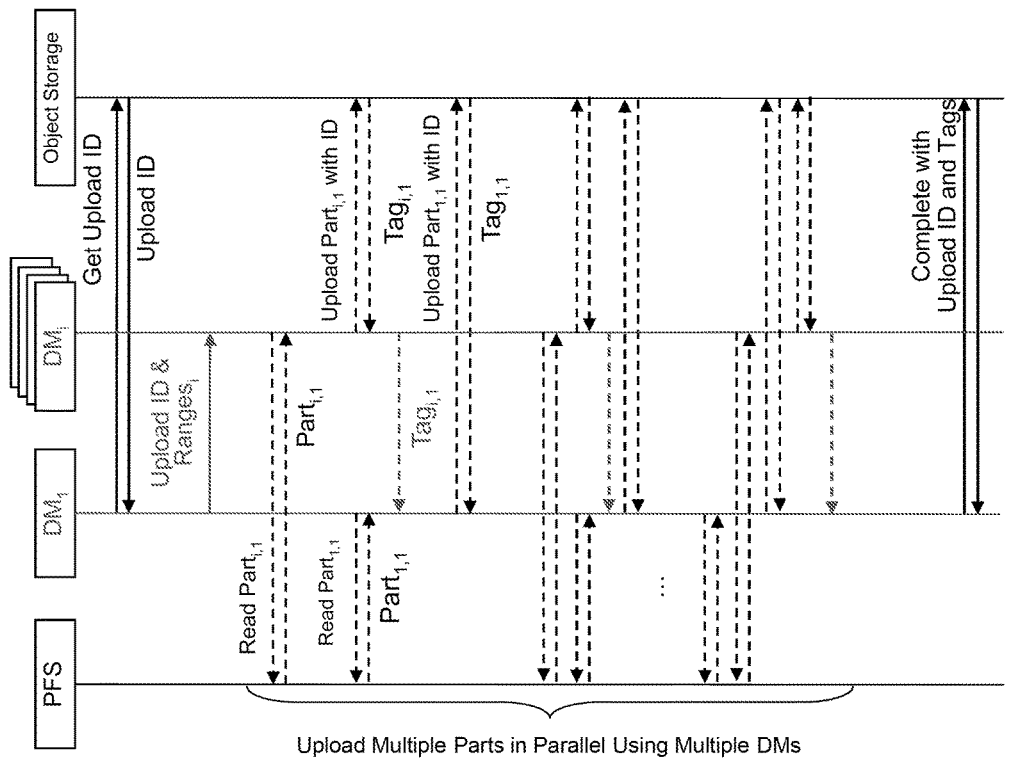
FIGS. 6 and 7 show examples of distributed multi-part data flows utilizing multiple data mover modules of a multi-tier storage system in an illustrative embodiment.
Figure 7:
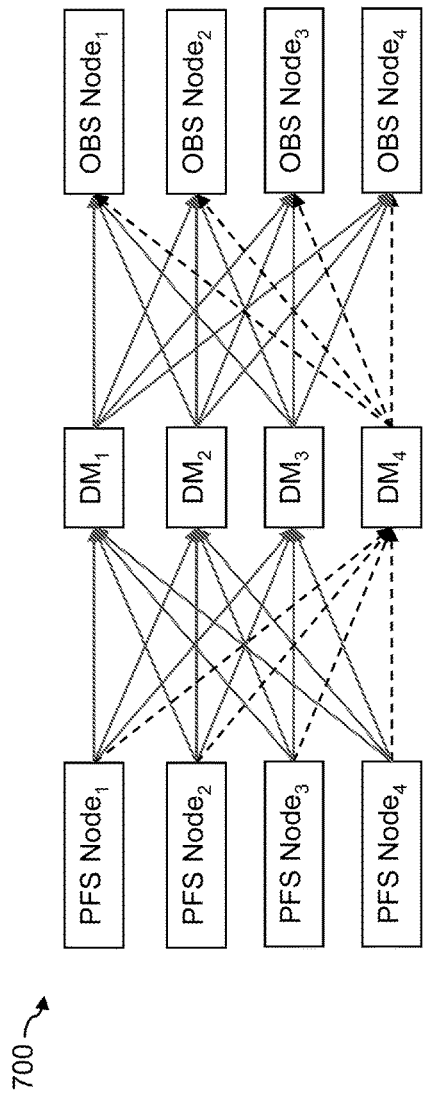

These and other issues are addressed in the illustrative embodiments of FIGS. 6 and 7, which implement a distributed multi-part data movement protocol in which different portions of a given data object are transferred between a fast tier and a capacity tier of a multi-tier storage system using different ones of a plurality of data mover modules.

Referring initially to FIG. 6, multi-part data movement between a PFS and an OBS via multiple DMs is illustrated. The data movement in this embodiment involves the multiple DMs uploading respective portions of a data object in multiple non-overlapping parts from the PFS to the OBS.

In a first phase of the distributed multi-part data movement protocol for transfer of the given data object, a first one of the DMs denoted $DM_1$ gets an Upload ID from the OBS for that data object. It then provides the Upload ID to other ones of the data mover modules denoted $DM_i$ and identifies to each of the other data mover modules $DM_i$ its corresponding one of the different portions of the given data object to be transferred. The different portions of the given data object to be transferred by respective ones of the data mover modules $DM_i$ are denoted as respective instances of $Ranges_i$. The data mover modules $DM_i$ are also intended to include the first data mover module $DM_1$.

In a second phase of the distributed multi-part data movement protocol for transfer of the given data object, each of the data mover modules $DM_i$ transfers its corresponding one of the portions of the data object from the PFS to the OBS. More particularly, each of the $DM_i$ uploads multiple parts of its corresponding portion in parallel from the PFS to the OBS. For example, the first part that $DM_1$ reads from the PFS is denoted $Part_{1,1}$. This first part and the other parts of the $DM_1$ portion of the data object are read in parallel from the PFS by $DM_1$ and then uploaded in parallel from $DM_1$ to the OBS. For each part uploaded from $DM_1$ to the OBS, the OBS provides $DM_1$ with a unique tag identifier. For example, $DM_1$ receives the tag identifier $Tag_{1,1}$ from the OBS responsive to uploading $Part_{1,1}$ to the OBS as illustrated. $DM_1$ similarly receives unique tag identifiers from the OBS for the other uploaded parts of the portion of the data object being transferred by $DM_1$ from the PFS to the OBS.

This process as described above for the example case of the first data mover module $DM_1$ is also performed in a similar manner by each of the other data mover modules $DM_i$, in parallel with its performance by the first data mover module $DM_1$. Accordingly, the first part that $DM_1$ reads from the PFS is denoted $Part_{i,1}$. This first part and the other parts of the $DM_i$ portion of the data object are read in parallel from the PFS by $DM_i$ and then uploaded in parallel from $DM_i$ to the OBS. For each part uploaded from $DM_i$ to the OBS, the OBS provides $DM_i$ with a unique tag identifier. For example, $DM_i$ receives the tag identifier $Tag_{i,1}$ from the OBS responsive to uploading $Part_{i,1}$ to the OBS as illustrated. $DM_i$ similarly receives unique tag identifiers from the OBS for the other uploaded parts of the portion of the data object being transferred by $DM_i$ from the PFS to the OBS.

Also in the second phase of the distributed multi-part data movement protocol, each of the data mover modules $DM_i$ other than $DM_1$ provides the unique tag identifiers of its respective transferred parts back to $DM_1$. As a result, $DM_1$ can keep track of the progress of the transfer of the individual parts of each of the portions of the data object as performed by the other ones of the data mover modules $DM_i$.

In a third phase of the distributed multi-part data movement protocol for transfer of the given data object, the first data mover module $DM_1$ is configured to complete the transfer of the given data object utilizing the unique tag identifiers for all of the distinct non-overlapping parts of each of the different portions.

Although the distributed multi-part data movement protocol in this embodiment includes three phases, more or fewer phases can be used in other embodiments. Also, the particular operations of a given phase can be varied in other embodiments. Accordingly, the particular protocol as illustrated in FIG. 6 is presented by way of illustrative example only and should not be construed as limiting in any way.

FIG. 7 shows the interactions between PFS nodes, DMs and OBS nodes in an information processing system 700 comprising a multi-tier storage system. As in the FIG. 5 embodiment, the multi-tier storage system includes a fast tier comprising four PFS nodes denoted PFS $Node_1$, PFS $Node_2$, PFS $Node_3$ and PFS $Node_4$, and a capacity tier comprising four OBS nodes denoted OBS $Node_1$, OBS $Node_2$, OBS $Node_3$ and OBS $Node_4$. The multi-tier storage system further comprises four DMs denoted $DM_1$, $DM_2$, $DM_3$ and $DM_4$ coupled between the PFS nodes of the fast tier and the OBS nodes of the capacity tier as illustrated.

In implementing an instance of distributed multi-part data movement of the type previously described in conjunction with FIG. 6, the system 700 utilizes three data mover modules $DM_1$, $DM_2$ and $DM_3$ to upload different portions of a given data object in parallel from the PFS nodes to the OBS nodes. The interconnections involved in this multi-part data movement between the PFS nodes and $DM_1$, $DM_2$ and $DM_3$ and between $DM_1$, $DM_2$ and $DM_3$ and the OBS nodes are shown as solid arrows in the figure. Other interconnections between the PFS nodes and the remaining data mover module $DM_4$ and between $DM_4$ and the OBS nodes are shown as dashed arrows in the figure.

It can be seen that the FIG. 7 embodiment utilizes multiple DMs to transfer respective different portions of the given data object in parallel between the PFS nodes and the OBS nodes. Each such portion is transferred in distinct non-overlapping parts by its corresponding DM. As a result, there are substantially fewer idle connections relative to the single DM multi-part data movement case of FIG. 5. Also, throughput traffic is not restricted to the bandwidth of a single data mover module. Upload time for transferring a large data object between the fast tier and the capacity tier is therefore significantly reduced relative to the single DM multi-part data movement case. Moreover, utilization of available resources of the PFS nodes and the OBS nodes is increased during transfer of a large data object.

The particular number of data mover modules that participate in the transfer of a given data object between storage tiers in a multi-tier storage system can be set in accordance with an inter-tier data movement policy implemented by a policy engine, such as the inter-tier data movement policy engine 118 in the FIG. 1 embodiment.

For example, a policy may specify that data objects at or below a certain threshold size are transferred using only a single data mover module, as in the example embodiments of FIGS. 4 and 5, while other data objects above that threshold size are transferred using multiple data mover modules, as in the example embodiments of FIGS. 6 and 7. Multiple thresholds may be used. For example, for data objects having a size above a first threshold, distributed multi-part data movement using two data mover modules may be implemented, while for data objects having a size above a second threshold greater than the first threshold, three data mover modules may be used, and for data objects having a size above a third threshold greater than the second threshold, four data mover modules may be used, and so on. Numerous other policy-based control mechanisms may be utilized to determine the particular number of data mover modules that will participate in a distributed multi-part data movement protocol for transfer of the data object between storage tiers.

Although the embodiments of FIGS. 4 through 7 refer to upload of a data object from a PFS of a fast tier to an OBS of a capacity tier, other types of data movement can be performed in other embodiments.

A set of example pseudocode for implementing the distributed multi-part data movement protocol illustrated in the embodiments of FIGS. 6 and 7 is shown in FIGS. 8, 9 and 10. In this pseudocode, a particular one of the DMs is designated as a "master DM" and corresponds, for example, to $DM_1$ in the protocol of FIGS. 6 and 7.

It is to be appreciated that this particular pseudocode shows just one example implementation of the distributed multi-part data movement protocol, and alternative implementations of the protocol can be used in other embodiments.

Illustrative embodiments of multi-tier storage systems with distributed multi-part data movement as disclosed herein can provide a number of significant advantages relative to conventional arrangements.

For example, some embodiments implement a distributed multi-part data movement protocol utilizing multiple data mover modules to transfer respective portions of a given data object between a parallel file system of a fast tier and an object store of a capacity tier in a multi-tier storage system. Such arrangements serve to increase storage system throughput while also making better use of available storage system resources.

In addition, some embodiments can implement the distributed multi-part data movement protocol without requiring any significant changes to PFS nodes or OBS nodes. In such embodiments, only the data mover modules are modified to implement functionality for distributed multi-part data movement. As a result, deployment of such functionality within a given multi-tier storage system is simplified.

These and other embodiments can advantageously provide significantly improved data transfer efficiency relative to conventional techniques commonly utilized in supercomputers and other types of HPC systems.

As a result of the significantly improved data transfer efficiency, improved computational performance is achievable in such HPC systems and in numerous other contexts involving tiered storage.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered examples of illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of compute nodes 102 and multi-tier storage system 104 comprising fast tier 106, capacity tier 108 and data mover modules 110 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute nodes, storage systems, storage tiers, storage devices, file systems, object stores and data mover modules. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. An apparatus comprising:
    a storage system comprising at least first and second storage tiers each comprising a plurality of storage devices;
    the storage system implementing a plurality of data mover modules for controlling movement of data objects between the first and second storage tiers;
    wherein a given one of the data objects is transferred between the first and second storage tiers utilizing a distributed multi-part data movement protocol in which different portions of the given data object are transferred between the first and second storage tiers by different ones of the data mover modules;
    wherein the distributed multi-part data movement protocol for transfer of the given data object comprises:
    a first phase in which a first one of the data mover modules obtains an upload identifier, communicates the upload identifier to other ones of the data mover modules, and identifies to each of the other data mover modules its corresponding one of the different portions of the given data object to be transferred;
    a second phase in which the first one of the data mover modules transfers its corresponding one of the different portions of the given data object in a plurality of distinct non-overlapping parts each having a unique tag identifier, and receives from each of the other data mover modules unique tag identifiers of respective ones of a plurality of distinct non-overlapping parts of the corresponding one of the different portions transferred by that data mover module; and
    a third phase in which the first one of the data mover modules completes the transfer of the given data object utilizing the unique tag identifiers for all of the distinct non-overlapping parts of each of the different portions.

2. The apparatus of claim 1 wherein the given data object comprises one of a single data file and a plurality of data files.

3. The apparatus of claim 1 wherein the first storage tier implements a parallel file system comprising a plurality of parallel file system nodes.

4. The apparatus of claim 1 wherein the second storage tier implements at least one object store comprising a plurality of object storage nodes and in which stored data objects have respective unique object identifiers.

5. The apparatus of claim 1 wherein each of the different portions is transferred between the first and second storage tiers by its corresponding data mover module as a plurality of distinct non-overlapping parts.

6. The apparatus of claim 5 wherein each of the plurality of distinct non-overlapping parts of each of the different portions has a corresponding unique tag identifier.

7. The apparatus of claim 1 wherein the data mover modules are configurable in a first mode of operation in which a first subset of the data mover modules are utilized in transferring a data object of a particular size between the first and second storage tiers and are further configurable in one or more additional modes of operation in which respective different subsets of the data mover modules are utilized in transferring the data object of the particular size between the first and second storage tiers.

8. The apparatus of claim 7 wherein the first mode of operation utilizes fewer of the data mover modules than each of the one or more additional modes of operation.

9. The apparatus of claim 1 wherein the storage system further comprises at least one configuration file associated with the data mover modules, and wherein the data mover modules are configurable in at least first and second different modes of operation, each involving utilization of a different number of the data mover modules to transfer a data object of a particular size between the first and second storage tiers, by storing respective first and second different sets of information in the configuration file.

10. The apparatus of claim 9 wherein the storage system comprises an application programming interface that permits an external component to control selection between the first and second different modes of operation by directing storage of a particular one of the first and second different sets of information in the configuration file.

11. The apparatus of claim 1 further comprising a plurality of compute nodes wherein at least one of the compute nodes implements at least a portion of the first storage tier of the storage system.

12. The apparatus of claim 1 wherein:
a first one of the portions of the given data object is transferred between the first and second storage tiers by a first one of the data mover modules;
a second one of the portions of the given data object different than the first portion is transferred between the first and second storage tiers by a second one of the data mover modules different than the first data mover module; and
the transfer of the second portion by the second data mover module is performed without utilizing the first data mover module.

13. A method comprising:
configuring a storage system with at least first and second storage tiers each comprising a plurality of storage devices;
implementing in the storage system a plurality of data mover modules for controlling movement of data objects between the first and second storage tiers; and
transferring a given one of the data objects between the first and second storage tiers utilizing a distributed multi-part data movement protocol in which different portions of the given data object are transferred between the first and second storage tiers by different ones of the data mover modules;
wherein the distributed multi-part data movement protocol for transfer of the given data object comprises:
a first phase in which a first one of the data mover modules obtains an upload identifier, communicates the upload identifier to other ones of the data mover modules, and identifies to each of the other data mover modules its corresponding one of the different portions of the given data object to be transferred;
a second phase in which the first one of the data mover modules transfers its corresponding one of the different portions of the given data object in a plurality of distinct non-overlapping parts each having a unique tag identifier, and receives from each of the other data mover modules unique tag identifiers of respective ones of a plurality of distinct non-overlapping parts of the corresponding one of the different portions transferred by that data mover module; and a third phase in which the first one of the data mover modules completes the transfer of the given data object utilizing the unique tag identifiers for all of the distinct non-overlapping parts of each of the different portions.

14. The method of claim 13 wherein the storage system further comprises at least one configuration file associated with the data mover modules, and wherein the data mover modules are configurable in at least first and second different modes of operation, each involving utilization of a different number of the data mover modules to transfer a data object of a particular size between the first and second storage tiers, by storing respective first and second different sets of information in the configuration file.

15. The method of claim 13 wherein:
a first one of the portions of the given data object is transferred between the first and second storage tiers by a first one of the data mover modules;
a second one of the portions of the given data object different than the first portion is transferred between the first and second storage tiers by a second one of the data mover modules different than the first data mover module; and
the transfer of the second portion by the second data mover module is performed without utilizing the first data mover module.

16. The method of claim 13 wherein the data mover modules are configurable in a first mode of operation in which a first subset of the data mover modules are utilized in transferring a data object of a particular size between the first and second storage tiers and are further configurable in one or more additional modes of operation in which respective different subsets of the data mover modules are utilized in transferring the data object of the particular size between the first and second storage tiers.

17. A non-transitory processor-readable storage medium having stored therein program code of one or more software programs, wherein the program code when executed by a processing platform causes said processing platform:
to configure a storage system with at least first and second storage tiers each comprising a plurality of storage devices;
to implement in the storage system a plurality of data mover modules for controlling movement of data objects between the first and second storage tiers; and
to transfer a given one of the data objects between the first and second storage tiers utilizing a distributed multi-part data movement protocol in which different portions of the given data object are transferred between the first and second storage tiers by different ones of the data mover modules;
wherein the distributed multi-part data movement protocol for transfer of the given data object comprises:
a first phase in which a first one of the data mover modules obtains an upload identifier, communicates the upload identifier to other ones of the data mover modules, and identifies to each of the other data mover modules its corresponding one of the different portions of the given data object to be transferred;
a second phase in which the first one of the data mover modules transfers its corresponding one of the different portions of the given data object in a plurality of distinct non-overlapping parts each having a unique tag identifier, and receives from each of the other data mover modules unique tag identifiers of respective ones of a plurality of distinct non-overlapping parts of the corresponding one of the different portions transferred by that data mover module; and a third phase in which the first one of the data mover modules completes the transfer of the given data object utilizing the unique tag identifiers for all of the distinct non-overlapping parts of each of the different portions.

18. The processor-readable storage medium of claim 17 wherein the storage system further comprises at least one configuration file associated with the data mover modules, and wherein the data mover modules are configurable in at least first and second different modes of operation, each involving utilization of a different number of the data mover modules to transfer a data object of a particular size between the first and second storage tiers, by storing respective first and second different sets of information in the configuration file.

19. The processor-readable storage medium of claim 17 wherein:
   a first one of the portions of the given data object is transferred between the first and second storage tiers by a first one of the data mover modules;
   a second one of the portions of the given data object different than the first portion is transferred between the first and second storage tiers by a second one of the data mover modules different than the first data mover module; and
   the transfer of the second portion by the second data mover module is performed without utilizing the first data mover module.

20. The processor-readable storage medium of claim 17 wherein the data mover modules are configurable in a first mode of operation in which a first subset of the data mover modules are utilized in transferring a data object of a particular size between the first and second storage tiers and are further configurable in one or more additional modes of operation in which respective different subsets of the data mover modules are utilized in transferring the data object of the particular size between the first and second storage tiers.

* * * * *